United States Patent
Hekmat

(10) Patent No.: US 7,647,533 B2
(45) Date of Patent: Jan. 12, 2010

(54) AUTOMATIC PROTECTION SWITCHING AND ERROR SIGNAL PROCESSING COORDINATION APPARATUS AND METHODS

(75) Inventor: Arash A. Hekmat, Ottawa (CA)

(73) Assignee: Alcatel Lucent, Paris (FR)

( * ) Notice: Subject to any disclaimer, the term of this patent is extended or adjusted under 35 U.S.C. 154(b) by 493 days.

(21) Appl. No.: 11/410,402

(22) Filed: Apr. 25, 2006

(65) Prior Publication Data
US 2007/0260940 A1 Nov. 8, 2007

(51) Int. Cl.
*G06F 11/00* (2006.01)
(52) U.S. Cl. .................. 714/45; 370/248; 370/278; 370/282; 370/287
(58) Field of Classification Search .............. 714/45; 370/248, 278, 282, 287
See application file for complete search history.

(56) References Cited

U.S. PATENT DOCUMENTS

| | | | |
|---|---|---|---|
| 2003/0161269 A1* | 8/2003 | Brusamolino et al. | 370/235.1 |
| 2003/0189895 A1* | 10/2003 | Limaye et al. | 370/216 |
| 2005/0278570 A1* | 12/2005 | Jastad et al. | 714/25 |
| 2006/0123007 A1* | 6/2006 | Aaron et al. | 707/9 |
| 2007/0109959 A1* | 5/2007 | Koren et al. | 370/218 |

* cited by examiner

*Primary Examiner*—Scott T Baderman
*Assistant Examiner*—Jigar Patel
(74) *Attorney, Agent, or Firm*—Smart + Biggar

(57) ABSTRACT

Automatic Protection Switching (APS) and error signal processing coordination apparatus and methods are disclosed. If a communication module that enables communication signals and error signals to be exchanged with a remote communication module is configured in an APS protection group, error signal processing by the communication module is restricted. This prevents Time Division Multiplexing (TDM) T1/E1 Remote Defect Indication (RDI) signal processing, for example, from interfering with Synchronous Optical Network/Synchronous Digital Hierarchy (SONET/SDH) unidirectional One-plus-One APS. Under certain conditions, however, a restricted communication module may be allowed to perform a restricted error processing operation or revert to normal unrestricted error signal processing.

12 Claims, 4 Drawing Sheets

AUTOMATIC PROTECTION SWITCHING AND ERROR SIGNAL PROCESSING COORDINATION APPARATUS AND METHODS

FIELD OF THE INVENTION

This invention relates generally to communications and, in particular, to coordinating Automatic Protection Switching (APS) and error signal processing.

BACKGROUND

In Synchronous Optical Network/Synchronous Digital Hierarchy (SONET/SDH) Unidirectional One-plus-One APS, the same traffic is transmitted on two ports that are part of the same protection group. User traffic in a transmit direction of a SONET/SDH port therefore runs independently of any defects in the receive direction of the SONET/SDH port, and vice versa. This means that a defect in the receive direction of a SONET/SDH port, for example, cannot disrupt the user traffic in the transmit direction of that port.

In Time Division Multiplexing (TDM) technology, however, when a defect is detected in the receive direction of a T1/E1 circuit, a Remote Defect Indication (RDI) signal is transmitted in the transmit direction of the T1/E1 circuit. A remote end device that receives the T1/E1 RDI signal is required, according to T1/E1 standards, to overwrite the user traffic on the T1/E1 circuit with a fixed Trunk Conditioning (TC) bit pattern. A defect in the receive direction of a T1/E1 circuit, which may be carried by a SONET/SDH port, would therefore lead to disruption of user traffic in the transmit direction of the T1/E1 circuit.

As a result of this incompatibility between SONET/SDH Unidirectional One-plus-One APS requirements and T1/E1 standards, SONET/SDH Unidirectional One-plus-One APS cannot operate properly on a SONET/SDH port that carries and terminates T1/E1 circuits.

Thus, there remains a need for techniques to coordinate APS and error signal processing.

SUMMARY OF THE INVENTION

Some embodiments of the invention adapt T1/E1 RDI processing for SONET/SDH Unidirectional One-plus-One APS operation of SONET/SDH ports that carry and terminate T1/E1 circuits.

According to an aspect of the invention, there is provided an apparatus that includes a communication module for enabling communication signals and error signals to be exchanged with a remote communication module, and an error signal processing coordination module operatively coupled to the communication module, the error signal processing coordination module being operable to restrict error signal processing by the communication module where the communication module is configured in an APS protection group.

The communication module incorporates the error signal processing coordination module in some embodiments.

The apparatus may also include a protection group configuration detector operatively coupled to the error signal processing coordination module and operable to determine whether the communication module is configured in an APS protection group.

The error signal processing coordination module may be operable to restrict error signal processing by at least one of: blocking transmission of an error signal from the communication module to the remote communication module, and causing the communication module to ignore an error signal received from the remote communication module.

The communication module may enable communication signals and error signals to be exchanged with the remote communication module over a TDM communication link established through a SONET/SDH port. In this case, the error signal processing coordination module may restrict error signal processing by blocking transmission of an RDI signal from the communication module to the remote communication module where a SONET/SDH near end defect exists in a receive direction of the SONET/SDH port, and/or by causing the communication module to ignore an RDI signal that is received from the remote communication module where a SONET/SDH remote end defect exists in the receive direction of the SONET/SDH port.

In some embodiments, the error signal processing coordination module is further operable to exchange error signal processing state information with a further error signal processing coordination module associated with a further communication module of the APS protection group. The error signal processing coordination module may then manage an error signal processing state of the communication module based on error signal processing state information received from the further error signal processing coordination module.

If the communication module enables communication signals and error signals to be exchanged with the remote communication module over a TDM communication link, the error signal processing coordination module may allow the communication module to perform a restricted error signal processing operation where state information received from the further error signal processing coordination module indicates that the further communication module is receiving a TDM T1/E1-level failure signal on a TDM T1/E1 circuit.

Where the communication module enables communication signals and error signals to be exchanged with the remote communication module through a SONET/SDH port, an error condition monitor operatively coupled to the SONET/SDH port may monitor error conditions associated with the SONET/SDH port to detect a SONET/SDH port defect in a transmit direction by processing SONET/SDH failure signals received from the remote communication module in a receive direction of the SONET/SDH port.

At least one of the communication module and the error signal processing coordination module may be implemented in software for execution by a processing element.

The apparatus may be implemented, for example, in communication equipment that includes a further communication module of the APS protection group. The communication equipment may also include a further error signal processing coordination module operatively coupled to the further communication module and operable to restrict error signal processing by the further communication module.

A method is also provided, and involves providing a communication module that enables communication signals and error signals to be exchanged with a remote communication module, and restricting error signal processing by the communication module where the communication module is configured in an APS protection group.

The operation of restricting may involve at least one of: blocking transmission of an error signal from the communication module to the remote communication module, and causing the communication module to ignore an error signal received from the remote communication module.

If the communication module enables communication signals and error signals to be exchanged with the remote communication module over a TDM communication link established through a SONET/SDH port, restricting may involve at least one of: blocking transmission of an RDI signal from the communication module to the remote communication module where a SONET/SDH near end defect exists in a receive direction of the SONET/SDH port, and causing the communication module to ignore an RDI signal received from the remote communication module where a SONET/SDH remote end defect exists in the receive direction of the SONET/SDH port.

The method may also involve exchanging error signal processing state information associated with the communication module and state information associated with a further communication module of the APS protection group, and managing an error signal processing state of the communication module based on the error signal processing state information associated with the further communication module.

The method may be embodied as instructions stored on a machine-readable medium, for instance.

Another aspect of the invention provides an apparatus that includes an error signal processing coordination module for restricting error signal processing by a communication module, which enables communication signals and error signals to be exchanged with a remote communication module, where the communication module is configured in an APS protection group, and an interface enabling the error signal processing coordination module to exchange error signal processing state information with an error signal processing coordination module associated with a further communication module of the APS protection group. The error signal processing coordination module is further operable to manage an error signal processing state of the communication module based on error signal processing state information received from the further error signal processing coordination module.

The apparatus may also include a memory, operatively coupled to the error signal processing coordination module, for storing error signal processing state information associated with the communication module.

Communication equipment that includes the apparatus may also include the communication module and the further communication module.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
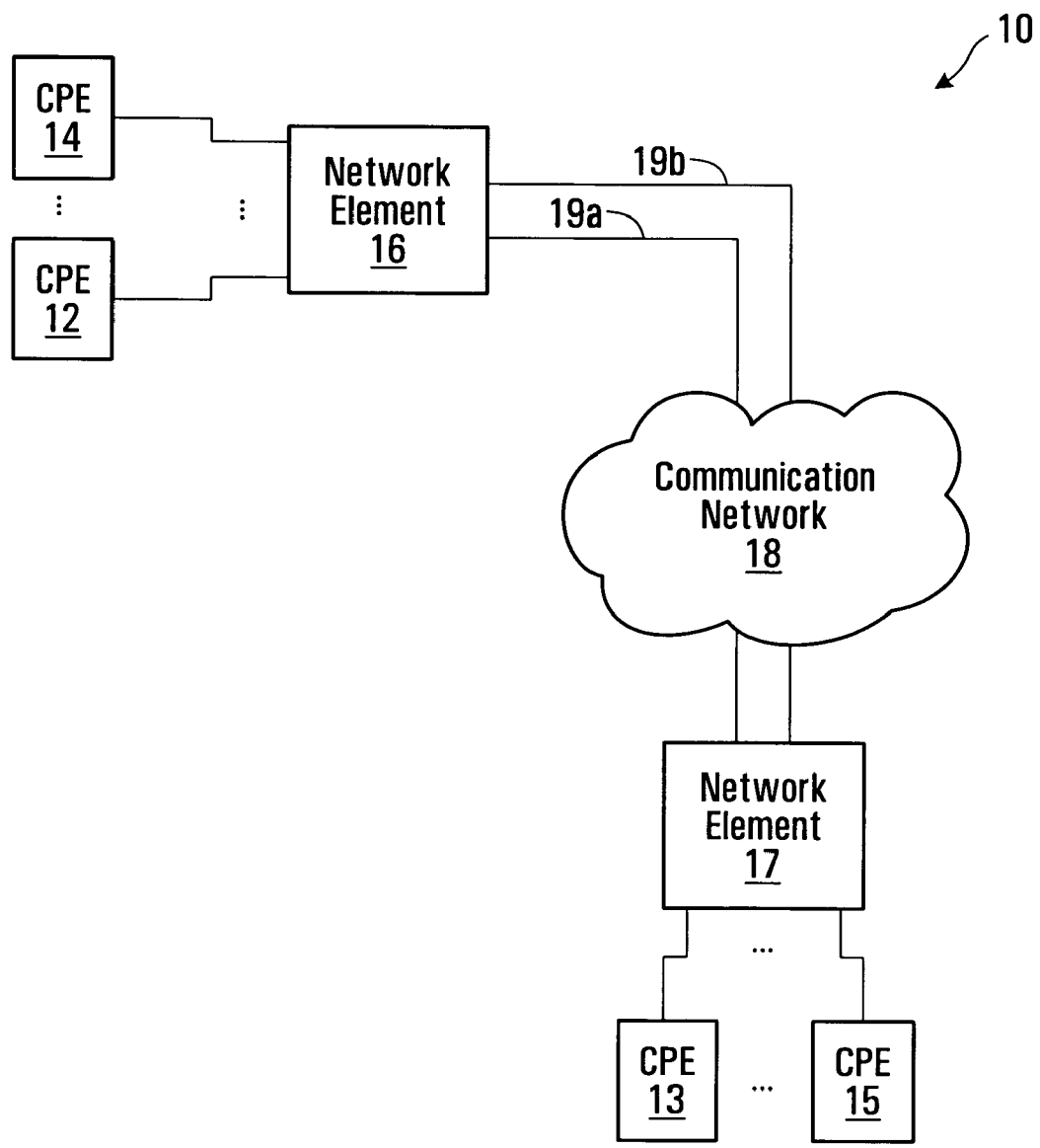
FIG. 1 is a block diagram of a communication system.

FIG. 1 is a block diagram of a communication system 10, in which embodiments of the invention could be implemented. The communication system 10 includes multiple Customer Premises Equipment (CPE) installations 12/14, 13/15, network elements 16, 17, and a communication network 18. Although only four CPEs 12/14, 13/15 and two network elements 16, 17 have been shown in FIG. 1 to avoid overly complicating the drawing, many more CPEs and network elements may be connected to the communication network 18. It should therefore be appreciated that the system of FIG. 1, as well as the contents of the other drawings, are intended solely for illustrative purposes, and that the present invention is in no way limited to the particular example embodiments explicitly shown in the drawings and described herein.

The CPEs 12/14, 13/15 represent communication equipment, illustratively end user communication devices, configured to receive and/or transmit communication signals. Although shown as being directly connected to the network elements 16, 17, it will be apparent that CPEs 12/14, 13/15 may communicate with the network elements 16, 17 through other intermediate components (not shown).

Switches and routers are illustrative of the types of communication equipment represented by the network elements 16, 17.

The communication network 18, in addition to the network elements 16, 17, may also include other network elements which route communication signals through the communication network 18.

Many different types of end user, intermediate, and network communication equipment, as well as the operation thereof, will be apparent to those skilled in the art. In general, the network elements 16, 17 transfer communication signals between the communication network 18 and the CPEs 12/14, 13/15. Embodiments of the invention are not limited to any particular types of communication equipment, transfer mechanisms, or protocols.

Redundancy protection is commonly used to provide a measure of protection against equipment failures in a communication system. This is illustrated in FIG. 1 by the two redundant lines 19a, 19b connecting network elements 16 and 17 through the communication network 18. In a protection group, one protected component or set of components is "active" at any time. Although "standby" redundant components in a protection group may also perform protected functions even when they are not active, only active components are typically relied upon to perform those functions. As noted above, the same traffic is transmitted on two ports that are part of the same protection group in SONET/SDH Unidirectional One-plus-One APS. At a receiving end, multiple receive modules may receive and process the traffic, but received traffic is actually accepted only from the active receiving module.

Figure 2:
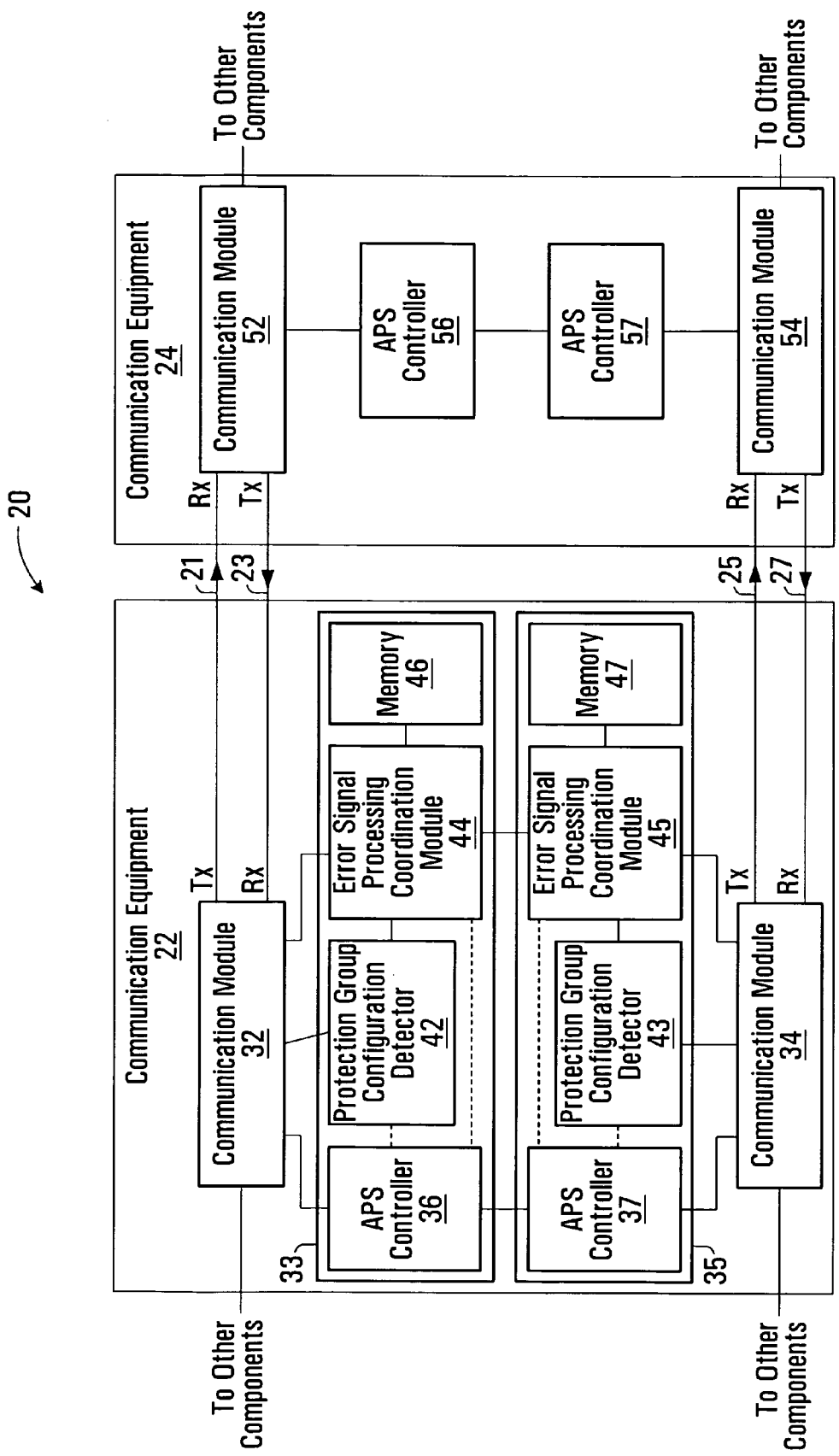
FIG. 2 is a block diagram of communication equipment incorporating an embodiment of the invention.

These and other aspects of redundancy protection, as well as coordination of redundancy protection and error signal processing, will become apparent from FIG. 2, which is a block diagram of communication equipment incorporating an embodiment of the invention.

In the system 20 of FIG. 2, communications between the communication equipment 22, 24 are protected by redundant components and APS. The communication equipment 22 includes redundant communication modules 32, 34, and protection control and coordination modules 33, 35. Each of the modules 33, 35 includes an APS controller 36, 37 operatively coupled to the communication modules 32, 34, a protection group configuration detector 42, 43 operatively coupled to the communication modules, an error signal processing coordination module 44, 45 operatively coupled to the configuration detector and to the communication modules, and a memory 46, 47 operatively coupled to the error signal processing coordination module. As shown, the APS controllers 36, 37 are operatively coupled together, as are the error signal processing coordination modules 44, 45.

The communication equipment 24 also includes redundant communication modules 52, 54 and APS controllers 56, 57 operatively coupled to the communication modules. The communication modules 32/52 and 34/54 are operatively coupled to each other through redundant communication links 21/25, 23/27.

The communication equipment 22 represents an example of one possible implementation of an embodiment of the invention. Other embodiments having fewer, further, or different components with similar or different interconnections are also contemplated. The invention is in no way limited to the specific example shown in FIG. 2. For example, although unidirectional communication links 21, 23, 25, 27 are shown in FIG. 2, other embodiments may operate in conjunction with bidirectional links. Different divisions of functions than shown are also contemplated.

The types of connections through which the components of FIG. 2 are operatively coupled may, to at least some extent, be implementation-dependent. Communication equipment components are often interconnected using various types of physical connectors and wired connections. In the case of cooperating software functions, an operative coupling may be through variables or registers, and thus be a logical coupling.

The communication modules 32, 34, 52, 54 are at least compatible, and in most embodiments are identical. In one embodiment, each communication module 32, 34, 52, 54 includes port or interface circuitry for connection to a communication line, and associated software or logic for controlling communications over the line. More generally, hardware, software, firmware, or combinations thereof may be used to implement the communication modules 32, 34, 52, 54. Electronic devices that may be suitable for this purpose include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Those skilled in the art will be familiar with many different types of communication modules and the internal details and operation thereof.

The APS controllers 36, 37, 56, 57, the protection group configuration detectors 42, 43, and the error signal processing coordination modules 44, 45 may also be implemented in hardware, software, and/or firmware.

Each memory 46, 47, however, includes one or more memory devices, illustratively solid state memory devices. Other types of memory devices, for use with movable, and possibly removable, storage media are also contemplated.

As noted above, many components of the communication equipment 22, 24 may be implemented using hardware, software, and/or firmware, and therefore are described herein primarily in terms of their functions. Based on the functional descriptions, a person skilled in the art will be enabled to implemented embodiments of the invention in any of various ways.

The communication modules 32, 34, 52, 54 enable communication signals, and error signals, to be exchanged between the communication equipment 22, 24 over the links 21, 23, 25, 27. The communication modules 32, 34 are configured in an APS protection group in the communication equipment 22, and the communication modules 52, 54 are configured in a corresponding APS protection group in the communication equipment 24. Activity of the communication modules 32/34, 52/54 within each protection group is controlled by the APS controllers 36/37, 56/57.

In a SONET/SDH Unidirectional One-plus-One APS implementation, the APS controllers 36/37, 56/57 independently control activity of the redundant communication modules 32/34, 52/54 based on received communication traffic. Communication traffic to be transmitted from the communication equipment 22 to the communication equipment 24 is duplicated by an "upstream" component (not shown) for transmission by both of the communication modules 32, 34 on the communication links 21, 25. Although the transmitted communication traffic may be received by both of the communication modules 52, 54, the received traffic is output to other components of the communication equipment 24 only from the active communication module. In the event of an error in the receive (Rx) direction at the active communication module 52, 54, or another protection switching trigger, the APS controllers 56, 57 switch activity to the standby communication module. The APS controllers 36, 37 operate in a similar manner to control activity of the communication modules 32, 34.

The importance of transmitting the same traffic from both communication modules 32, 34, regardless of which module is currently active, can be illustrated by considering an example scenario in which the communication modules 32, 54 are active. In this case, if traffic is transmitted from only the communication module 32, the active communication module 54 at the communication equipment 24 will not receive the communication traffic, and thus the traffic will not be accepted at the communication equipment 24. As noted above, however, some communication protocols specify that RDI signals, TC bit patterns, or possibly other error signals are to be transmitted instead of user traffic under certain conditions. Other error signal processing functions may similarly interfere with APS operation.

The protection group configuration detectors 42, 43 and the error signal processing coordination modules 44, 45 support a mechanism for coordinating error signal processing with APS. The protection group configuration detectors 42, 43 are operable to determine whether their corresponding communication modules 32, 34 are configured in an APS protection group. This detection may involve querying the communication modules 32, 34 or the APS controllers 36, 37, or accessing information stored in the memories 46, 47, for example. The memories 46, 47 may store configuration information associated with the communication modules 32, 34 a list of communication modules that are part of a protection group, or other information that may be used to determine whether a communication module is part of a protection group. The protection group configuration detectors 42, 43 may thus be operatively coupled to the memories 46, 47, even though no such connections have been explicitly shown in FIG. 2 so as to avoid further complicating the drawing.

Another possible option would be to have the APS controllers 36, 37 inform the protection group configuration detectors 42, 43 of the communication modules that are included in the protection group for which they manage activity switching, and thus each protection group configuration detector may be operatively coupled to its counterpart APS controller.

In some embodiments, an error signal processing coordination module 44, 45 is implemented only in conjunction with a communication module that is part of a protection group. The determination function of the protection group configuration detectors 42, 43 may then be moreso inherent or implied in that the error signal processing coordination modules 44, 45 can assume that any communication modules with which it interacts are part of a protection group. An explicit protection group detection or determination function therefore need not necessarily be provided in all embodiments.

If the communication module 32 has been configured in an APS protection group, then the error signal processing coordination module 44 restricts error signal processing by the communication module. The manner in which this restricting function is accomplished is at least to some extent dependent upon how the communication module 32 is implemented.

Signal processing functions such as error signal processing may be implemented in software code segments or routines that can be enabled or disabled by the error signal processing coordination modules 44, 45, for example. The error signal processing coordination modules 44, 45 might instead detect and intercept error signals that are received by the communication equipment 22 so that the communication modules 32, 34 do not receive, and thus do not process, those error signals. Error signals that are generated by the communication modules 32, 34 could also or instead be intercepted by the error signal processing coordination modules 44, 45 to prevent those error signals from disrupting traffic on the links 21, 25. These types of interactions between the communication modules 32, 34 and the error signal processing coordination modules 44, 45 may be facilitated by implementing the error signal processing coordination modules, and possibly other components of the protection control and coordination modules 33, 35, as part of communication software of the communication modules, or otherwise integrating protection control and/or coordination within the communication modules 32, 34.

Other control options for restricting error signal processing by the communication modules 32, 34 may also be or become apparent to those skilled in the art.

The error signal processing coordination module 44 may restrict the error signal processing operations that are performed by the communication module 32, for example, by blocking transmission of an error signal from the communication module to the remote communication module 52. Transmission of such an error signal may be blocked, for instance, by blocking output of the error signal to the communication link 21 or preventing generation of the error signal by the communication module 32.

Where the communication links 21, 23 are TDM communication links established through a SONET/SDH port, for example, the error signal processing coordination module 44 might be operable to restrict error signal processing by blocking transmission of an RDI signal from the communication module 32 to the remote communication module 52.

Embodiments of the invention may thereby involve adapting standard T1/E1 RDI for proper operation of SONET/SDH Unidirectional One-plus-One APS for SONET/SDH ports. According to the techniques disclosed herein, a SONET/SDH port that carries and terminates T1/E1 circuits and is part of a SONET/SDH Unidirectional One-plus-One APS group would not transmit a T1/E1 RDI signal in the transmit (Tx) direction of the contained T1/E1 circuits. As noted above, a T1/E1 RDI signal would normally be transmitted in the transmit (Tx) direction if a SONET/SDH near end defect exists in the receive (Rx) direction of the containing SONET/SDH port. SONET/SDH near end defects that normally cause a protection switch and transmission of an RDI signal include loss of signal (LOS), loss of frame (LOF) alignment, out of frame (OOF) alignment, line Alarm Indication Signal (AIS), or Path AIS.

The error signal processing coordination module 44 may also or instead restrict error signal processing by causing the communication module 32 to ignore an error signal that is received from the remote communication module 52. A SONET/SDH port that carries and terminates T1/E1 circuits and is part of a SONET/SDH Unidirectional One-plus-One APS group may thus ignore a T1/E1 RDI signal that is received in the receive (Rx) direction of the contained T1/E1 circuits if a SONET/SDH remote end defect exists in the receive (Rx) direction of the containing SONET/SDH port. A SONET/SDH remote end defect may be one of line RDI or path RDI, for example. It should be noted that receiving a SONET/SDH remote end defect in the receive (Rx) direction of a SONET/SDH port is an indication that the source of the defect originated in the near end transmit (Tx) direction at the communication module 32.

In FIG. 2, the error signal processing coordination module 45 is operatively coupled to the communication module 34, and coordinates error signal processing by the communication module 34 substantially as described above for the error signal processing coordination module 44 and the communication module 32. According to other embodiments of the invention, a single protection control and coordination module coordinates error signal processing and protection for multiple communication modules, illustratively all communication modules in a protection group.

The communication equipment 24 may also include one or more configuration detectors, error signal processing coordination modules, and memories for coordinating error signal processing with APS operation. These components have not been explicitly shown in FIG. 2 so as to avoid further complicating the drawing.

Restrictions on error signal processing may be managed by the error signal processing coordination modules 44, 45 by managing state information stored in their respective memories 46, 47. State information may be stored in the form of one or more state tables, for instance. According to one embodiment of the invention, separate state tables for receive and transmit RDI states for each communication module of a protection group are stored in a memory. In FIG. 2, each error signal processing coordination module 44, 45 maintains the state tables for its communication module in the memories 46, 47, although a common memory could instead be shared by multiple error signal processing coordination modules for this purpose.

Error signal processing state information may be exchanged between communication modules in an APS protection group, or between their associated error signal processing coordination modules. The error signal processing state of one communication module may then be managed on the basis of error signal processing state information associated with other communication modules of the same protection group. Error signal processing state information may include, for example, any or all of a current error signal processing restriction state (e.g., whether a communication module is blocked from receiving and/or sending error signals), a current error signal transmission state (e.g., whether the communication module has transmitted an error signal), and a current error signal reception state (e.g., whether the communication module has received an error signal).

Figure 3:
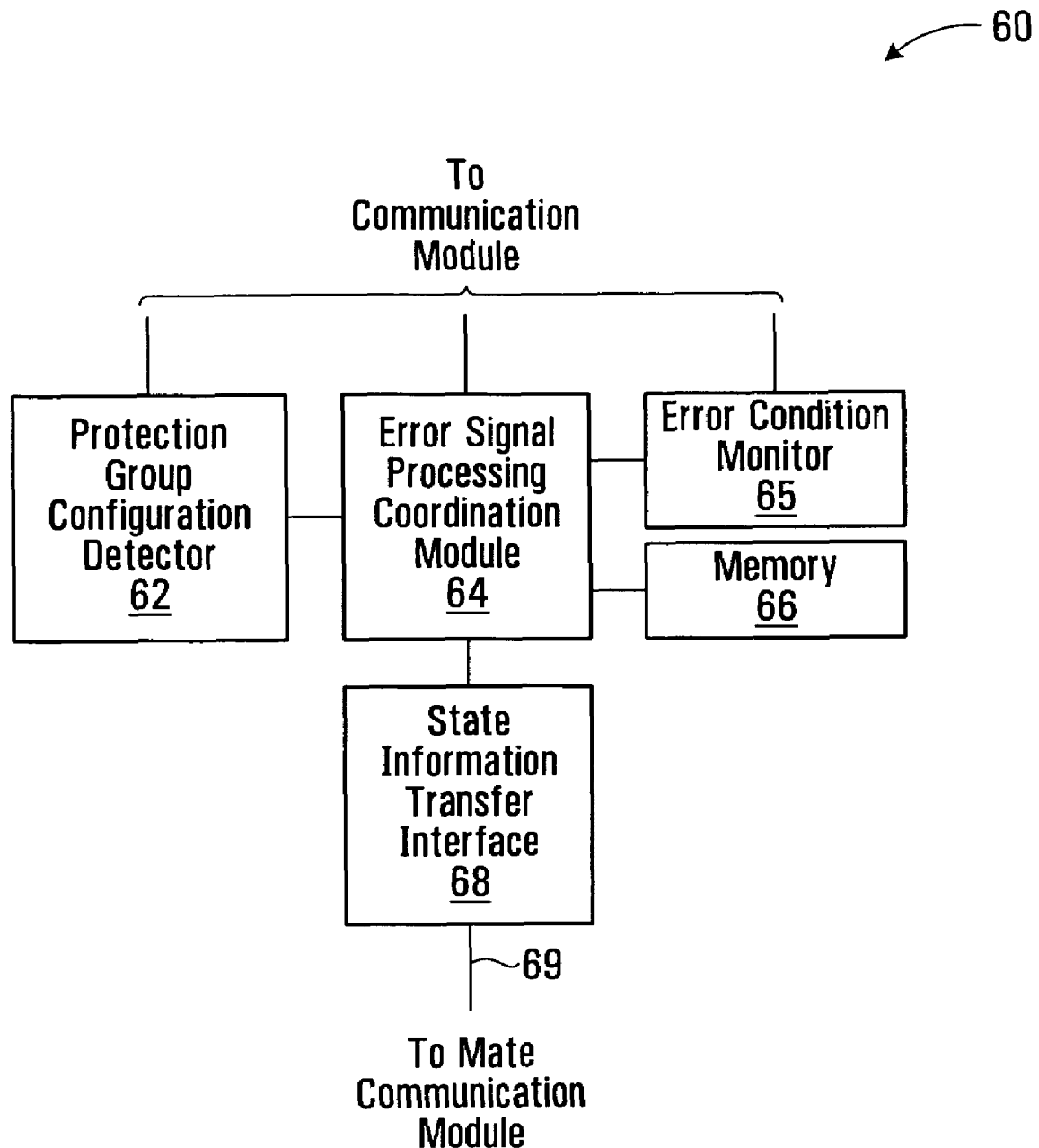
FIG. 3 is a block diagram of an apparatus according to another embodiment of the invention.

FIG. 3 is a block diagram of an apparatus according to another embodiment of the invention. The protection group configuration detector 62, the error signal processing coordination module 64, and the memory 66 of the apparatus 60 may be implemented and interconnected in a substantially similar manner as the corresponding components shown in FIG. 2 and described above.

The error condition monitor 65, which may be implemented in hardware, software, firmware, or some combination thereof, monitors error conditions associated with a communication link over which a communication module communicates. The monitor 65 may interact with error signal detection or processing components of a communication module, for example, to determine the SONET/SDH status of Rx and Tx links of the communication module. In some embodiments, when the error condition monitor 65 detects a SONET/SDH defect on the Rx link, transmit T1/E1 RDI processing is restricted by the error signal processing coordination module 64, and when a SONET/SDH defect is detected on the Tx link, receive T1/E1 RDI processing is restricted.

In an implementation with unidirectional communication links, a communication module only receives information on the Rx link and thus does not directly know the status of the Tx link. However, in SONET/SDH protocols, for instance, when there is a defect on the Tx link the far end device that is on the receiving end of the defect sends a SONET/SDH Line or Path RDI signal back to the sending communication module on its Tx link, which is the sending module's Rx link. Therefore, when a communication module receives a SONET/SDH Line or Path RDI signal, which those skilled in the art will appreciate is different than the T1/E1 RDI signal, on its Rx link it deduces that there is a SONET/SDH defect on the Tx link.

The state information transfer interface 68 enables the error signal processing coordination module 64 to exchange error signal processing state information with a mate communication module in the same APS protection group, or its associated error signal processing coordination module, through a connection 69. The connection 69 may be an existing backplane connection between electronic circuit card slots, for example, or an additional connection that is provided for the purposes of transferring error signal processing state information. It should be appreciated that the interface 68 may be or include a logical interface in other embodiments, where a common memory is used by multiple error processing coordination modules to store state information, for instance.

The error signal processing coordination module 64 may also manage an error signal processing state of its associated communication module(s) based on error signal processing state information for one or more other communication modules in the same protection group. As noted above, state information associated with a communication module may be stored in the memory 66 as one or more state tables, illustratively as transmit and receive RDI state tables.

Two SONET/SDH ports that carry and terminate T1/E1 circuits that are operating as active/working and standby/protecting mate ports in a SONET/SDH Unidirectional One-plus-One APS may thus communicate T1/E1 RDI states of the receive (Rx) and the transmit (Tx) directions of the contained T1/E1 circuits with each other, for example. This allows the mate ports to collectively respond in accordance with TDM standards under certain conditions, illustratively where a remote end T1/E1 defect exists in the presence of a SONET/SDH defect on one of the mate ports. Thus, under certain conditions, the error signal processing coordination module 64 can allow a communication module to revert back to normal error signal processing, such as standard T1/E1 RDI processing.

An error signal processing coordination module that is restricting standard T1/E1 RDI error signal processing, for example, may allow a communication module to revert back to the standard T1/E1 RDI error signal processing, on a per T1/E1 circuit basis, if it receives a message from its mate error signal processing coordination module indicating that a mate communication module in the same protection group is receiving a T1/E1-level failure signal that should be processed in accordance with normal/standard RDI error signal processing.

Figure 4:
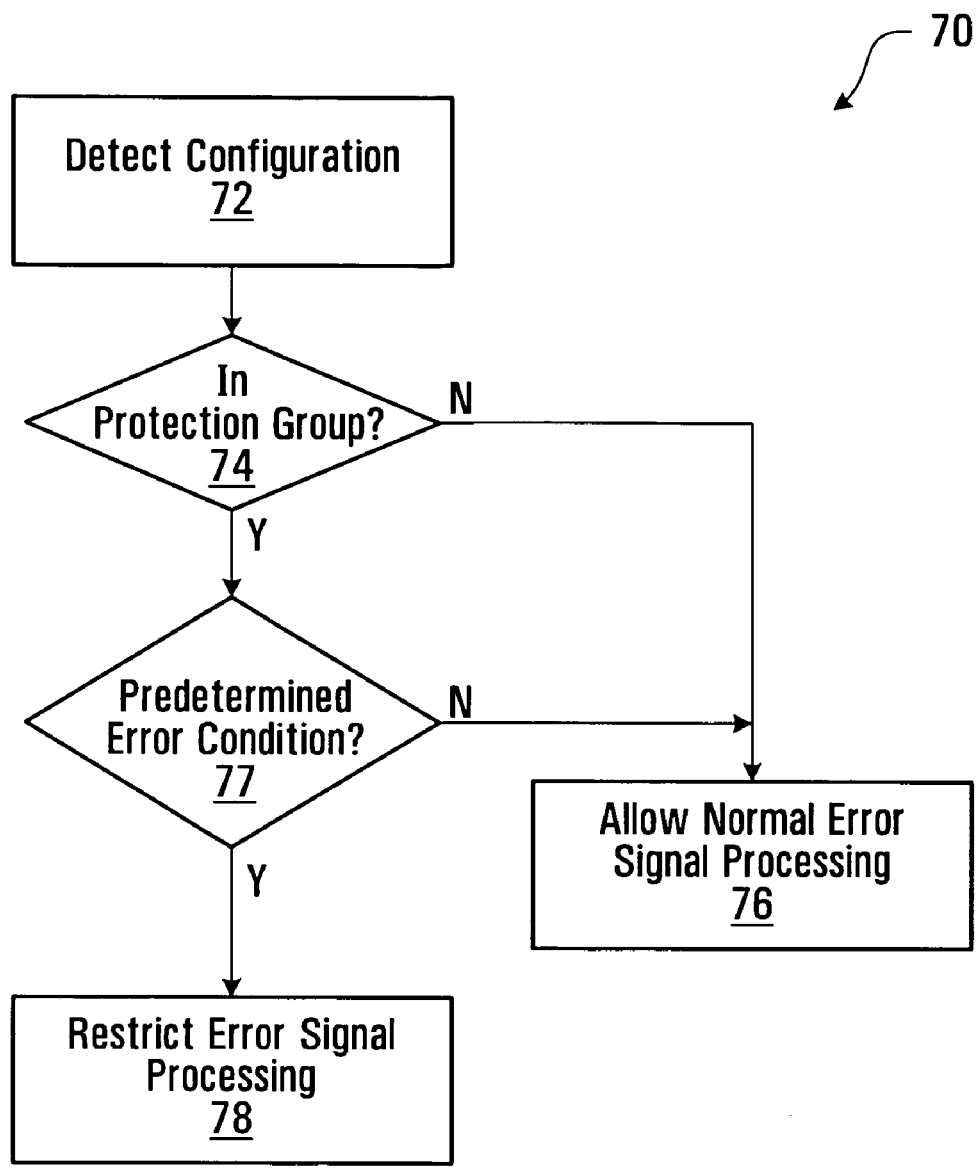
FIG. 4 is a flow diagram illustrating a method of a further embodiment of the invention.

FIG. 4 is a flow diagram illustrating a method of a further embodiment of the invention. The method 70 includes detecting a configuration of a communication module at 72. Configuration detection represents one possible mechanism through which a determination as to whether a communication module is configured in an APS protection group may be made at 74. As noted above, explicit protection group detection or configuration determination might not be provided in all embodiments of the invention. If error signal processing coordination is implemented only in conjunction with communication modules that are configured or are to be used in protection groups, for example, it may be assumed that a communication module is part of a protection group.

If the communication module is not part of an APS protection group, then it is allowed to perform normal error signal processing, as shown at 76. Otherwise, error signal processing by the communication module may be restricted at 78. In the method 70, error signal processing is restricted under certain error conditions, as determined at 77. Examples of conditions under which error signal processing by a communication module is restricted, or alternatively allowed to proceed or revert back to normal at 76, have been described above.

It should be appreciated that the method 70 is illustrative of one embodiment of the invention. Other embodiments may include further, fewer, or different operations performed in a similar or different order than shown.

For example, restricting error signal processing at 78 may involve blocking transmission of an error signal from the communication module to the remote communication module or causing the communication module to ignore an error signal received from a remote communication module. Other embodiments may also involve exchanging error signal processing state information associated with mate communication modules in the APS protection group, and managing the error signal processing state of one communication module based on error signal processing state information associated with its mate communication module(s). Although not explicitly shown in FIG. 4, error condition monitoring may be ongoing while a communication module is in a restricted error processing state, and thus a determination such as the determination at 77 may be made after error signal processing is restricted at 78. A communication module may be maintained in the restricted state or be allowed to perform a specific restricted operation or to revert to an unrestricted state, possibly temporarily, based on current error conditions.

Further variations of the method 70 may be or become apparent to those skilled in the art.

In the absence of error signal processing coordination, protection schemes such as SONET/SDH Unidirectional One-plus-One APS might not operate properly.

What has been described is merely illustrative of the application of principles of embodiments of the invention. Other arrangements and methods can be implemented by those skilled in the art without departing from the scope of the present invention.

For example, the division of functions shown in FIGS. 2 and 3 are illustrative of embodiments of the invention. Further, fewer, or different elements may be used to implement the techniques disclosed herein.

These techniques may be applied to communication equipment in which multiple protection groups have been configured. Error signal processing may be coordinated with APS operation in any or all protection groups.

It should also be appreciated that the disclosed techniques may be applicable to other protection schemes than SONET/SDH Unidirectional One-plus-One APS.

In addition, although described primarily in the context of methods and systems, other implementations of the invention are also contemplated, as instructions stored on a machine-readable medium, for example.

I claim:

1. An apparatus comprising:
a communication module for enabling communication signals and error signals to be exchanged with a remote communication module and for performing normal error signal processing; and
an error signal processing coordination module operatively coupled to the communication module, the error signal processing coordination module being operable to restrict the normal error signal processing by the communication module, while allowing the communication module to exchange at least communication signals, where the communication module is configured in an Automatic Protection Switching (APS) protection group,
wherein at least one of the communication module and the error signal processing coordination module comprises one or more hardware components,
wherein the communication module enables communication signals and error signals to be exchanged with the remote communication module over a Time Division Multiplexing (TDM) communication link established through a Synchronous Optical Network/Synchronous Digital Hierarchy (SONET/SDH) port,
wherein the error signal processing coordination module is operable to restrict the normal error signal processing by blocking transmission of a Remote Defect Indication (RDI) signal from the communication module to the remote communication module where a SONET/SDH near end defect exists in a receive direction of the SONET/SDH port.

2. The apparatus of claim 1, wherein the communication module comprises the error signal processing coordination module.

3. The apparatus of claim 1, further comprising:
a protection group configuration detector operatively coupled to the error signal processing coordination module and operable to determine whether the communication module is configured in an APS protection group.

4. An apparatus comprising:
a communication module for enabling communication signals and error signals to be exchanged with a remote communication module and for performing normal error signal processing; and
an error signal processing coordination module operatively coupled to the communication module, the error signal processing coordination module being operable to restrict the normal error signal processing by the communication module, while allowing the communication module to exchange at least communication signals, where the communication module is configured in an Automatic Protection Switching (APS) protection group,
wherein at least one of the communication module and the error signal processing coordination module comprises one or more hardware components,
wherein the communication module enables communication signals and error signals to be exchanged with the remote communication module over a Time Division Multiplexing (TDM) communication link established through a Synchronous Optical Network/Synchronous Digital Hierarchy (SONET/SDH) port,
wherein the error signal processing coordination module is operable to restrict the normal error signal processing by causing the communication module to ignore a Remote Defect Indication (RDI) signal that is received from the remote communication module where a SONET/SDH remote end defect exists in a receive direction of the SONET/SDH port.

5. The apparatus of claim 1, wherein the error signal processing coordination module is further operable to exchange error signal processing state information with a further error signal processing coordination module associated with a further communication module of the APS protection group, and to manage an error signal processing state of the communication module based on error signal processing state information received from the further error signal processing coordination module.

6. An apparatus comprising:
a communication module for enabling communication signals and error signals to be exchanged with a remote communication module and for performing normal error signal processing; and
an error signal processing coordination module operatively coupled to the communication module, the error signal processing coordination module being operable to restrict the normal error signal processing by the communication module, while allowing the communication module to exchange at least communication signals, where the communication module is configured in an Automatic Protection Switching (APS) protection group,
wherein at least one of the communication module and the error signal processing coordination module comprises one or more hardware components,
wherein the error signal processing coordination module is further operable to exchange error signal processing state information with a further error signal processing coordination module associated with a further communication module of the APS protection group, and to manage an error signal processing state of the communication module based on error signal processing state information received from the further error signal processing coordination module,
wherein the communication module enables communication signals and error signals to be exchanged with the remote communication module over a Time Division Multiplexing (TDM) communication link established through a Synchronous Optical Network/Synchronous Digital Hierarchy (SONET/SDH) port,
wherein the error signal processing coordination module is operable to restrict the normal error signal processing by blocking transmission of a Remote Defect Indication (RDI) signal from the communication module to the remote communication module where a SONET/SDH near end defect exists in a receive direction of the SONET/SDH port,
wherein the error signal processing coordination module allows the communication module to revert to perform a restricted normal error signal processing operation where state information received from the further error signal processing coordination module indicates that the further communication module is receiving a TDM T1/E1-level failure signal on a TDM T1/E1 circuit.

7. An apparatus comprising:
a communication module for enabling communication signals and error signals to be exchanged with a remote communication module and for performing normal error signal processing; and
an error signal processing coordination module operatively coupled to the communication module, the error signal processing coordination module being operable to restrict the normal error signal processing by the communication module, while allowing the communication module to exchange at least communication signals, where the communication module is configured in an Automatic Protection Switching (APS) protection group, wherein at least one of the communication module and the error signal processing coordination module comprises one or more hardware components, wherein the communication module enables communication signals and error signals to be exchanged with the remote communication module over a Time Division Multiplexing (TDM) communication link established through a Synchronous Optical Network/Synchronous Digital Hierarchy (SONET/SDH) port, wherein the error signal processing coordination module is operable to restrict the normal error signal processing by blocking transmission of a Remote Defect Indication (RDI) signal from the communication module to the remote communication module where a SONET/SDH near end defect exists in a receive direction of the SONET/SDH port, the apparatus further comprising:

an error condition monitor operatively coupled to the SONET/SDH port and operable to monitor error conditions associated with the SONET/SDH port, the error condition monitor detecting a SONET/SDH port defect in a transmit direction by processing SONET/SDH failure signals received from the remote communication module in a receive direction of the SONET/SDH port.

8. Communication equipment comprising:

the apparatus of claim 1; and a further communication module comprising the APS protection group.

9. The communication equipment of claim 8, further comprising:

a further error signal processing coordination module operatively coupled to the further communication module and operable to restrict the normal error signal processing by the further communication module.

10. A method comprising:

providing a communication module that enables communication signals and error signals to be exchanged with a remote communication module and performs normal error signal processing; and restricting the normal error signal processing by the communication module where the communication module is configured in an Automatic Protection Switching (APS) protection group, while allowing the communication module to exchange at least communication signals, wherein the communication module enables communication signals and error signals to be exchanged with the remote communication module over a Time Division Multiplexing (TDM) communication link established through a Synchronous Optical Network/Synchronous Digital Hierarchy (SONET/SDH) port, and wherein restricting comprises at least one of:

blocking transmission of a Remote Defect Indication (RDI) signal from the communication module to the remote communication module where a SONET/SDH near end defect exists in a receive direction of the SONET/SDH port; and causing the communication module to ignore an RDI signal received from the remote communication module where a SONET/SDH remote end defect exists in a receive direction of the SONET/SDH port.

11. The method of claim 10, further comprising:

exchanging error signal processing state information associated with the communication module and state information associated with a further communication module of the APS protection group; and managing an error signal processing state of the communication module based on the error signal processing state information associated with the further communication module.

12. A machine-readable medium storing instructions which when executed perform the method of claim 10.

* * * * *

UNITED STATES PATENT AND TRADEMARK OFFICE
CERTIFICATE OF CORRECTION

| | | |
|---|---|---|
| PATENT NO. | : 7,647,533 B2 | Page 1 of 1 |
| APPLICATION NO. | : 11/410402 | |
| DATED | : January 12, 2010 | |
| INVENTOR(S) | : Arash A. Hekmat | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this

Twenty-eighth Day of December, 2010

David J. Kappos
*Director of the United States Patent and Trademark Office*